Figure 1:
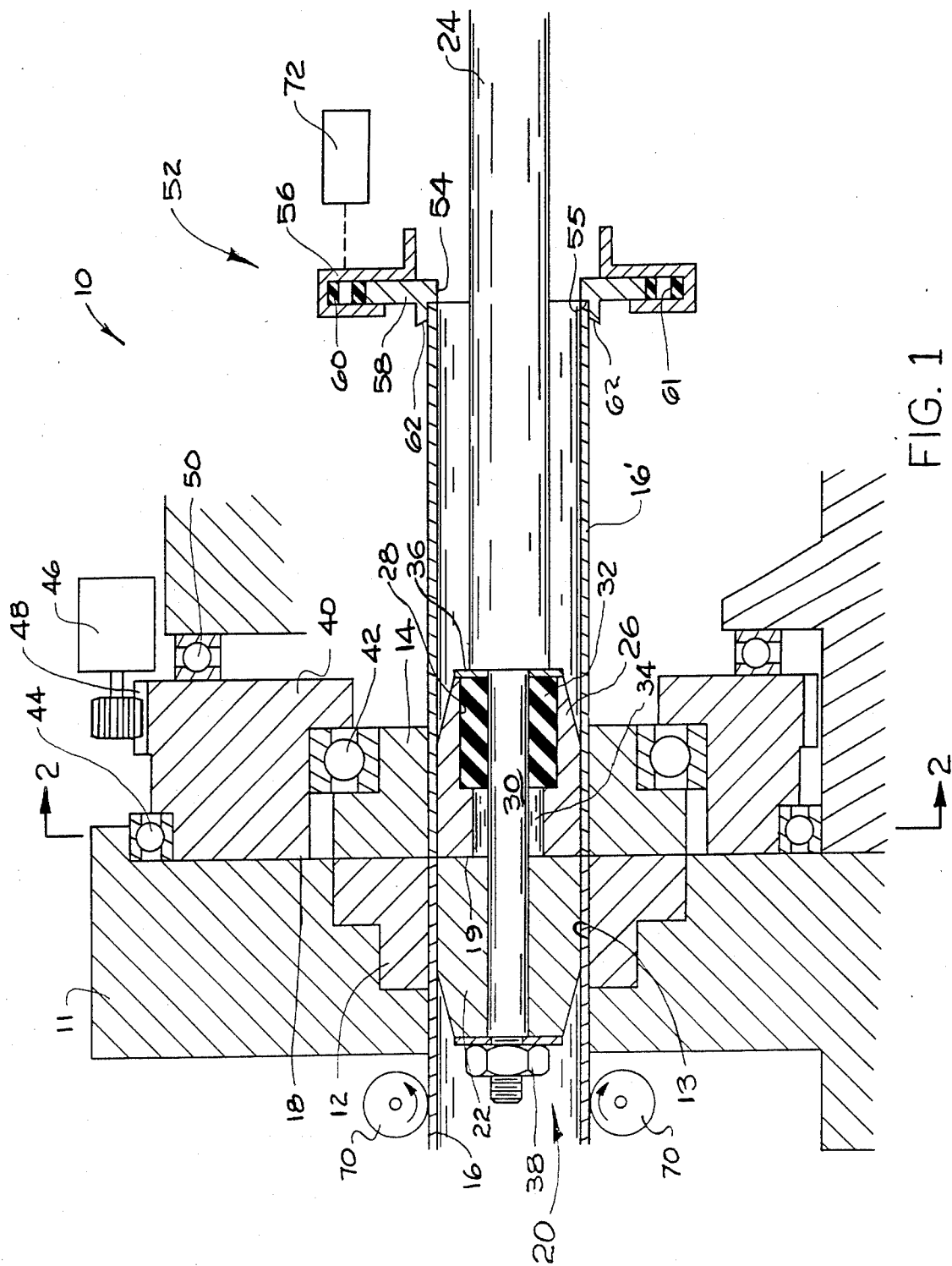

United States Patent [19]

Werner

[11] Patent Number: 4,794,834
[45] Date of Patent: Jan. 3, 1989

[54] TUBE SHEARING APPARATUS

[75] Inventor: John A. Werner, Wauwatosa, Wis.

[73] Assignee: Eaton Corporation, Cleveland, Ohio

[21] Appl. No.: 49,854

[22] Filed: May 15, 1987

[51] Int. Cl.$^4$ .............................................. B23D 21/04
[52] U.S. Cl. ........................................ 83/185; 83/188;
83/199; 83/467 K; 82/87; 82/100
[58] Field of Search ................. 83/185, 188, 199, 181,
83/184, 186, 195, 200, 467 R; 82/87, 100

[56] References Cited

U.S. PATENT DOCUMENTS

| | | | |
|---|---|---|---|
| 877,855 | 1/1908 | Murray | 83/195 |
| 1,216,426 | 2/1917 | Erickson | 83/199 |
| 1,280,199 | 10/1918 | Erickson | 83/199 |
| 3,494,233 | 2/1970 | Kojima | 83/199 |
| 3,657,951 | 4/1972 | Clark | 83/199 |
| 4,003,279 | 1/1977 | Carmichael et al. | 83/199 |
| 4,059,036 | 11/1977 | Hartley | 83/188 |

Primary Examiner—Donald R. Schran
Assistant Examiner—Eugenia A. Jones
Attorney, Agent, or Firm—Edward L. Brown, Jr.

[57] ABSTRACT

A tube cutting apparatus for orbital shearing of tube stock in uniform lengths including a stationary die surrounding the tube stock placed adjacent an orbiting die of similar aperture, the orbiting die being rotatably mounted within an eccentric die holder which in turn is rotatably mounted on an axis offset from the stationary die with drive means for turning the die holder and causing the orbiting die to move in an orbiting path, and a two-section mandrel carried on an extendable ram which is removably insertable within the tube stock being cut, the first section being coaxially fixed to the ram while the second section has limited movement laterally relative to the first section, the second section having an inside diameter portion greater than the outside diameter of the ram and a elastic ring positioned between the second section and the ram to maintain the two sections in concentric alignment in the absence of outside forces.

6 Claims, 2 Drawing Sheets

TUBE SHEARING APPARATUS

BACKGROUND OF THE INVENTION

The invention relates to the shearing of heavy wall tube stock through the use of a pair of exterior dies, one of which moves in an orbital path with respect to the other with a pair of mandrel dies located within the tubing which move in a like motion.

The general concept of shearing tubing by orbital movement of one die member relative to a stationary die is known in the prior art as taught in the following U.S. patents:

U.S. Pat. No. 1,216,426 to Erickson
U.S. Pat. No. 3,494,233 to Kojima
U.S. Pat. No. 3,657,951 to Clark
U.S. Pat. No. 4,003,279 to Carmichael.

The patents listed teach a variety of adjustable eccentrics or dual eccentrics as typified by Kojima.

The use of a two-piece mandrel in tube shearing has also been generally taught in the following U.S. patents:

U.S. Pat. 1,280,199 to Erickson
U.S. Pat. 4,059,036 to Hartley and the previously mentioned patents to Kojima, Clark and Erickson (U.S. Pat. No. 1,216,426). Some of the mandrels are of the expandable type such as Hartley, while others are loose-fitting fixed-diameter types.

The quality of the sheared surface, or in other words the distortion caused by the shearing action is effected by the degree of fit of the mandrel sections in the tube being cut and the adjacent exterior dies. In the above-mentioned patent to Kojima (U.S. Pat. No. 3,494,233) the mandrel parts, as shown in FIG. 5, have a loose fit within the inside diamter of tube and also their edges are not accurately positioned at the shearing plane of the tube, all of which promotes a greater amount of deformation or burr at the cut edge of the tube.

The present invention provides a sheared edge surface on relatively thick-walled tubing which is relatively free of distortion and burr when compared with the prior art methods mentioned above. To achieve this, applicant's mandrel has a fixed-diameter close-fitting tolerance with the inside diameter of the tube stock. Therefore the removal of the mandrel after the tube is cut becomes more difficult by reason of the increased possibilities of the mandrel hanging up in the section of tube stock just cut. At some time during the angular rotation of the orbiting die cut, the tube length being cut will shear free from the stationary length of tubing while the orbiting die continues to rotate through a full 360° revolution. If the tube mandrel die sections are slightly out of alignment concentrically, the outside die section will hang up on the piece of tube and the ram will be unable to remove the mandrel. Located inside the second section of the mandrel is a large elastic ring which snugly fits on the ram diameter so that whenever the outside lateral forces are removed from the mandrel, the resilient or elastic ring brings the second mandrel section back into concentric alignment with the first section permitting easy removal of the extendable ram.

The tube-cutter of the present invention also incorporates a tube-stop apparatus which accommodates the wobble cutting action of the movable die and thereby prevents the section of tube being cut from jamming between the tube stop and dies. This is accomplished by providing a stop member which although it does not move longitudinally in the apparatus is free to move laterally with the orbiting die during the eccentric cutting movement. This jamming problem becomes more pronounced with thicker wall tube being cut in relatively short lengths.

It is therefore the principal object of the present invention to provide an improved wobble-type cut-off machine which provides constant length sections with a minimum amount of tube deformation.

Another object of the present invention is to provide a high speed cutting apparatus which leaves a relatively clean edge.

Another object of the present invention is to provide a wobble-type cut-off machine for heavy wall tube which has a tube stop which permits the tubing being cut to move with the orbiting die.

Figure 2:
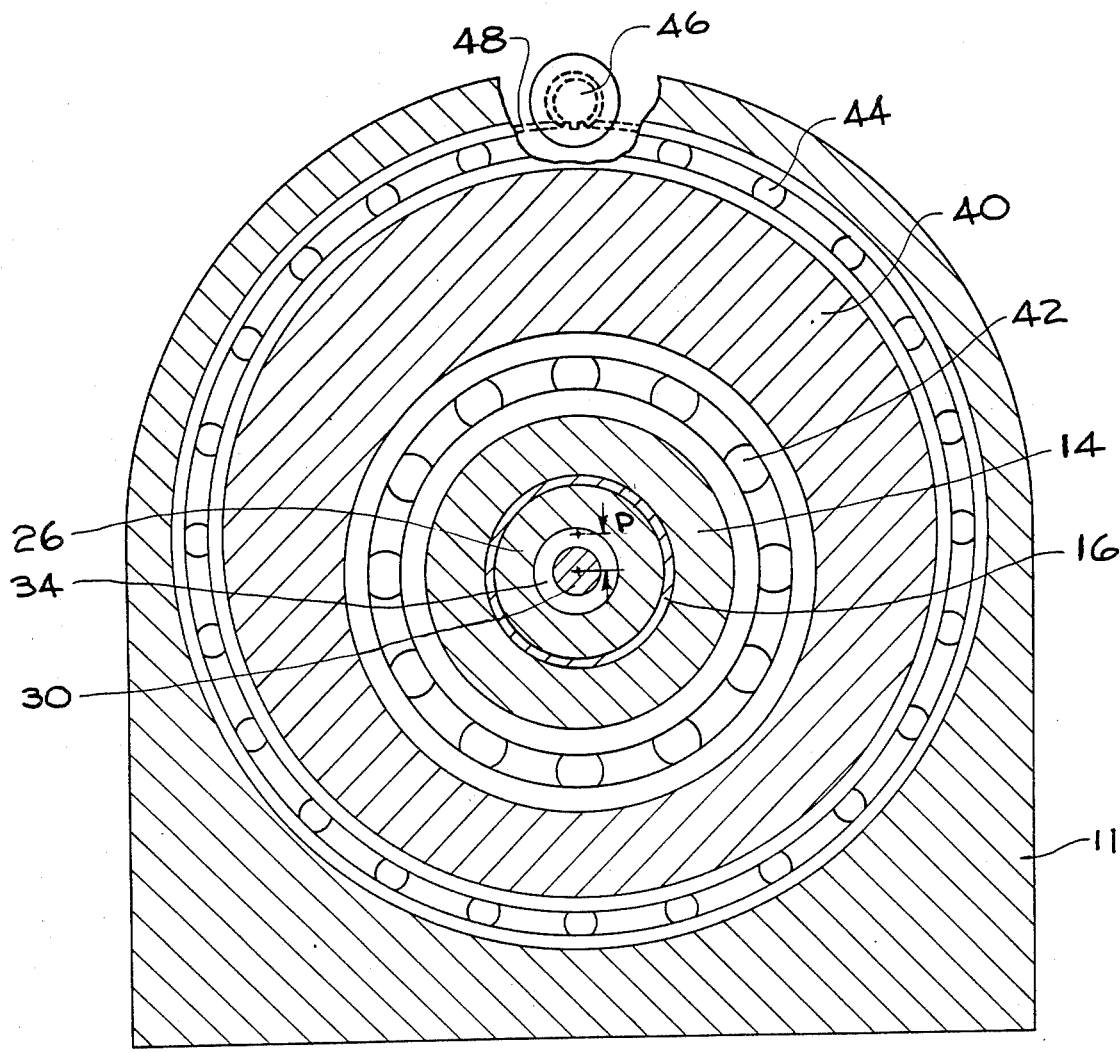

Other objects will now be described by way of example, with referenced to the accompanying drawings in which:

FIG. 1 is a longitudinal vertical sectional view view of a preferred embodiment of the present invention; and FIG. 2 is a transverse sectional view taken along lines 2—2 of FIG. 1.

The tube cutting apparatus or machine of the present invention, which is generally described by reference numeral 10 comprises a stationary exterior die 12 concentrically positioned next to a orbiting die 14, both of which receive a section of tube stock 16. The contacting surfaces between the two dies 12 and 14 define the shear plane 18 of the apparatus which is laterally positioned relative to the longitudinal axis of the dies 12 and 14.

Positioned within the tube stock 16 is a two section mandrel 20 having a first section 22 mounted coaxially on a ram 24. Positioned adjacent first section 22 is a second section 26 which can move laterally relative to first section 22 and the ram 24. Second section 26 includes an inside diameter portion 28 which is substantially larger than the reduced diameter shaft 30 of ram 24. Positioned between inside diameter portion 28 and the shaft 30, is a resilient ring member 32 extending most of the length of the second mandrel section 26. Ring member 32 can be made from any elastic material which when relaxed from external loads will seek its original shape. Positioned adjacent ring 32 is an open annular space 34 into which the ring member 32 can deform during limited lateral movement of die section 26. Die sections 22 and 26 are held in contact with each other along a lateral contacting surface 19 by shaft 30 by reason of back-up washer 36 and nut and washer 38 threadably mounted on the end of shaft 30. The outside diameter of mandrel 20 has a relatively close tolerance fit with the inside diameter of the tube stock 16, cut on the order of 10% of the tube wall thickness. This close tolerance provides a relatively clean and less deformed cut.

Orbiting die 14 is mounted within a die holder 40 through a roller bearing 42 so that as the die holder 40 rotates, the die 14 is free from rotation. Die holder 40 is in turn rotatably mounted to the base 11 of the apparatus through bearings 44 along an axis which is offset from the longitudinal axis of stationary die 12 a distance P, as shown in FIG. 2. In other words, oribiting die 14 is concentrically aligned with stationary die 12 at only one rotary position of die holder 40, which position is illustrated in FIG. 1.

Die holder 40 is driven by a motor and spur gear 46, which in turn drives a ring gear 48 located on the periphery of die holder 40 about a similar eccentric axis of rotation. Die holder 40 is held against stationary die 12 through any type of thrust bearing 50 so that the dies are maintained in closely spaced alignment during the shearing of the tube stock.

Positioned to the right of orbiting die 14 in FIG. 1, is a tube stop 52. The tube stop is in turn attached at the base 11 and can be adjustably positioned from the shear plane 18 of the dies to determine the length of the tube being cut. The tube stop 52 has an opening 54 therein for passage of the mandrel 20, which must be withdrawn after each tube cut. The tube stop 20 includes a bracket member 56 which receives and surrounds a stop member 58. The stop member 58 can slide laterally within bracket 56 to accommodate the orbital movement of the orbiting die 14 so that the length of tubing being cut does not cock or jam. Located around the periphery of stop 58 is a soft resilient ring 60 with a plurality of holes 61 therein. The ring 60 can be easily deformed as the orbiting die 14 moves the section of tube being cut through an amplitude approximately equivalent to the wall thickness of the tube. Located at the outer end of stop 58 is a chamfered surface 62 which receives the incoming end of the tube stock 16. The tube stop 52 is moved back and forth between its stop position of FIG. 1, and its retracted position to the right with any type of lineal motor 72 in conjunction with the movement of ram 24.

OPERATION

The tube stock sections which come in various lengths are advanced into the machine from the left, by some drive means such as drive and holding roller 70. The tube stock 16 is driven into the tube cutting machine 10 until it contacts the tube stop 52. The tube stop can be adjustably positioned longitudinally on the base 11 of the machine so as to cut whatever length tube is required. The mandrel 20 is then introduced into the tube stock from the right side of the machine, as seen in the drawing, through opening 54 in tube stop 52. Mandrel 20 including stationary section 22 and laterally movable section 26 are both carried on an extendable ram 24 which can be powered by a variety of different means, not shown in the drawing. Mandrel 20 is extended until the contacting surfaces 19 between the two mandrel sections lie precisely within the shear plane 18 of the machine 10. This positioning can be accomplished by a variety of means not shown, such as for example microswitches activated by the position of ram 24.

Once the mandrel 20 is positioned at the shear plane 18, the motor and spur gear 46 are actuated causing the die holder 40 to begin rotation through a 360° arc. Since the die holder 40 is slightly off-center a distance P from the axis of the stationary die 12, the orbiting die 14, during this 360° rotation will move in an orbital path around the periphery of tube stock 16 causing the shearing of the tube stock to move from two points oppositely positioned on the tube through 180° cuts. The amount of eccentricity between the die holder 40 and stationary die 12 can be adjusted by various means but would be of a magnitude approximately the wall thickness of the tubing being cut. As the orbiting die 14 begins to move in its orbital path, the second section 26 of the mandrel 20 likewise will be forced to move in an orbital path, preventing the tube stock 16 from collapsing while providing complimentary shearing edges which act in opposition to the shearing edges on the stationary die 12.

As die holder 40 begins to rotate and move die 14 along an orbital path, the friction between the die 14 and the tube stock 16 prevents the orbiting die from rotating with the die holder 40 by reason of roller bearings 42. An additional thrust bearing 50, maintains the die holder 40 in contact with stationary die 12 during the shearing action. As die 14 begins to shear the tube stock, it will force the second section 26 in a similar offset nature causing the bottom shearing edge of section 26 to shear the opposite portions of the tube stock 16 against the adjacent cutting edge of stationary die 12. As the die 14 moves through its orbital cutting path, the section of tube stock being cut also moves in a similar orbital path. Since the right hand end of the tube stock 16 is contained within stop member 58, the orbital movement of the die 14 thus causes the stop member 58 to move within the fixed bracket 56 in a similar orbital path. This orbital movement of stop member 58 is only resisted by a soft resilient ring 60. Therefore, the tube section being cut will not cock and bind between the stop 52 and the dies 12 and 14.

Once the die 14 completes its full 360° rotation, the axis of dies 12 and 14 will again be concentric with each other. Before the section 16' of the tube stock which was cut can be removed from the machine 10, the mandrel 20 must be withdrawn to its retracted position while the tube stop 52 is also retracted a sufficient distance to disengage the cut tube from die 14. The mandrel 20 is withdrawn through opening 54 since it must be withdrawn the full length of the tube cut. Resilient ring member 32, in the absence of outside lateral forces, will bring mandrel section 26 back into concentric alignment with the first section 22 of the mandrel. In the absence of this aligning function of ring 32, the mandrel 20 will hang-up on the edge of the tube section just cut and prevent the ram from withdrawing the mandrel 20 from the machine.

Once the mandrel 20 is fully retracted to the right of tube stop 52 along with the retraction of tube stop 52, the section of tube 16 just cut is free to fall from the machine. The tube stop 52 is extended back to its FIG. 1 position and the machine 10 is now ready to cut the next section of tube stock which is driven from the left into the machine, as viewed in the drawing.

Having described the invention with sufficient clarity to enable those familiar with the art to construct and use it, I claim:

1. A tube cutting apparatus for shearing tube stock at uniform lengths comprising:
   a base;
   a stationary die attached to the base with an aperture therein corresponding with the size of the tube stock being cut, and a lateral face which defines the shear plane of the apparatus;
   an orbiting die with a similar aperture and lateral face concentrically positioned adjacent the stationary die;
   an eccentric die holder rotatably mounted to the base with an axis of rotation offset from the stationary die, the orbiting die being rotatably mounted in the die holder;
   drive means for turning the die holder and causing the orbiting die to move in an orbiting path relative to the stationary die;
   an extendable ram attached to the base;
   a two section fixed diameter mandrel die means with lateral contacting surfaces between the two sections, said sections having a close tolerance with the inside diameter of the tube and being carried on said extendable ram which is removably insertable within the tube being cut, with the contacting surfaces located in the shear plane;

the first section being fixed to the ram while the second section is laterally movable relative to the first section during orbital movement of the orbiting die, the second section having an inside diameter portion greater than an outside diameter of the ram;

a tube stop means mounted on the base member having a bracket and a stop member attached to the bracket which allows the stop member limited lateral movement; and a resilient ring means positioned between the inside diameter portion of the second section and the said outside diameter of the ram whereby the resilient ring maintains the two mandrels section in concentric relation in the absence of outside forces from the orbiting die.

2. A tube cutting apparatus as set forth in claim 1, wherein the tube stop means is adjustably positioned from the die members to vary the length of the tube being cut, and the tube stop means includes a resilient ring member positioned between the stop member and the bracket which allows the stop member to move laterally with the orbiting movement of the orbiting die so that the length of tube being cut does not cock or jam.

3. A tube cutting apparatus as set forth in claim 1, wherein the tube stop means is adjustably positioned from the die members to vary the length of the tube being cut, the stop member has a chamfered surface surrounding part of its circumference for guiding the tube stock therein; and a resilient ring member positioned between the stop member and the bracket which allows the stop member to move laterally with the orbiting movement of the orbiting die so that the length of tube being cut does not cock or jam.

4. A tube cutting apparatus as set forth in claim 1 wherein the tube stop means is adjustably positioned on the base to vary the length of the tube being cut, the stop member having a tapered peripheral surface for guiding the tube into the stop member, a resilient ring member positioned between the stop member and the bracket.

5. A tube cutting apparatus as set forth in claim 1, wherein the extendable ram extends and retracts through the tube stop means and the drive means rotates the die holder through at least 360°.

6. A tube cutting apparatus as set forth in claim 1, wherein, the tube stop means being connectable with the ram whereby the tube stop means retracts and extends with the ram.

* * * * *